United States Patent
Davis

(10) Patent No.: US 10,423,141 B2
(45) Date of Patent: Sep. 24, 2019

(54) INTELLIGENT DEVICE-CONFIGURABLE ICONS

(71) Applicant: ROCKWELL AUTOMATION TECHNOLOGIES, INC., Mayfield Heights, OH (US)

(72) Inventor: Wayne R. Davis, Cambridge (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 712 days.

(21) Appl. No.: 14/937,390

(22) Filed: Nov. 10, 2015

(65) Prior Publication Data

US 2016/0062602 A1 Mar. 3, 2016

Related U.S. Application Data

(63) Continuation of application No. 13/428,742, filed on Mar. 23, 2012.

(51) Int. Cl.
| | |
|---|---|
| *G06F 3/0482* | (2013.01) |
| *G05B 19/042* | (2006.01) |
| *G06F 3/0481* | (2013.01) |
| *G05B 15/00* | (2006.01) |

(52) U.S. Cl.
CPC ....... *G05B 19/0423* (2013.01); *G06F 3/0482* (2013.01); *G06F 3/04817* (2013.01); *G05B 2219/23258* (2013.01); *G05B 2219/25066* (2013.01); *G05B 2219/25428* (2013.01); *G05B 2219/32142* (2013.01)

(58) Field of Classification Search
CPC ...... G05B 19/0423; G05B 2219/23258; G05B 2219/25066; G05B 2219/25428; G05B 2219/32142; G06F 3/04817; G06F 3/0482
See application file for complete search history.

(56) References Cited

U.S. PATENT DOCUMENTS

| | | |
|---|---|---|
| 6,618,630 B1 | 9/2003 | Jundt et al. |
| 7,134,090 B2 | 11/2006 | Kodosky et al. |
| 2004/0098148 A1* | 5/2004 | Retlich ............ G05B 19/41885 700/83 |

(Continued)

FOREIGN PATENT DOCUMENTS

| | | |
|---|---|---|
| EP | 1569055 A1 | 8/2005 |
| EP | 2149827 A1 | 2/2010 |
| WO | 03/029907 A1 | 4/2003 |

OTHER PUBLICATIONS

Office Action for CN Application No. 201310095170.8 dated Sep. 25, 2015.

*Primary Examiner* — Thomas C Lee
*Assistant Examiner* — Brian T McMenemy
(74) *Attorney, Agent, or Firm* — Fletcher Yoder, P.C.

(57) ABSTRACT

Systems and methods are disclosed for providing an icon for display by a user interface from an automation device that the icon depicts. Specifically, present embodiments are directed to methods and systems capable of detecting, with processing circuitry of an automation device, a shell program on a workstation via an automation control network. Further, embodiments are capable of providing icon configuration data to the shell program from the automation device, wherein the configuration data controls characteristics of an icon representative of the automation device for display in a visualization of the workstation.

25 Claims, 6 Drawing Sheets

(56) References Cited

U.S. PATENT DOCUMENTS

| | | |
|---|---|---|
| 2004/0120344 A1 | 6/2004 | Sato et al. |
| 2004/0220703 A1* | 11/2004 | LePage .............. H03K 17/0828 |
| | | 700/292 |
| 2005/0021705 A1 | 1/2005 | Jurisch |
| 2005/0102441 A1* | 5/2005 | Yeh ....................... G06F 9/4413 |
| | | 710/8 |
| 2007/0061018 A1* | 3/2007 | Callaghan .............. G05B 19/05 |
| | | 700/1 |
| 2008/0228924 A1 | 9/2008 | Herberger et al. |
| 2010/0023313 A1 | 1/2010 | Faist et al. |
| 2010/0146423 A1 | 6/2010 | Duchene et al. |
| 2011/0153034 A1* | 6/2011 | Philliben ............ G05B 23/0216 |
| | | 700/17 |
| 2011/0238731 A1 | 9/2011 | Corson |
| 2012/0178431 A1* | 7/2012 | Gold ................... H04M 1/7253 |
| | | 455/420 |

\* cited by examiner

1

INTELLIGENT DEVICE-CONFIGURABLE ICONS

CROSS-REFERENCE TO RELATED APPLICATIONS

This application claims the benefit of U.S. patent application Ser. No. 13/428,742 entitled "Intelligent Device-Configurable Icons" filed on Mar. 23, 2012, which is hereby incorporated by reference herein.

BACKGROUND

The present disclosure relates generally to the iconic representation of an object or device in an industrial automation system. More specifically, the present disclosure relates to an automation system and method capable of providing icons representative of specific devices within the automation system.

In a number of industrial applications, automation devices (e.g., motor drives, input/output (I/O) interfaces, programmable logic controllers (PLCs), operator interfaces, and so forth) function together in a networked manner. Indeed, a number of automation devices may be networked together to establish an automation control system. A User Interface (UI) or Human Machine Interface (HMI) may be incorporated into such an automation control system via a workstation, terminal, or the like to provide access to aspects (e.g., configuration capabilities, stored data, and functional features) of the automation devices on the network. The UI typically includes certain representations or icons for the networked automation devices that enable selection of a particular device for accessing aspects of that device. Specifically, a user typically configures the UI to include certain icons that are representative of devices of the automation control system, and this configuration generally occurs at the workstation. If there are multiple workstations, the UI for each workstation is typically configured separately by a user to include representations of the networked automation devices.

It is now recognized that traditional systems and methods for providing iconic representations of automation devices within an automation control system can result in inconsistencies and inefficiency. Existing techniques can be inefficient and inconvenient for automation system operators, integrators, and providers. Accordingly, present embodiments are directed to more efficient and effective systems and methods for providing iconic representations of devices within an automation system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
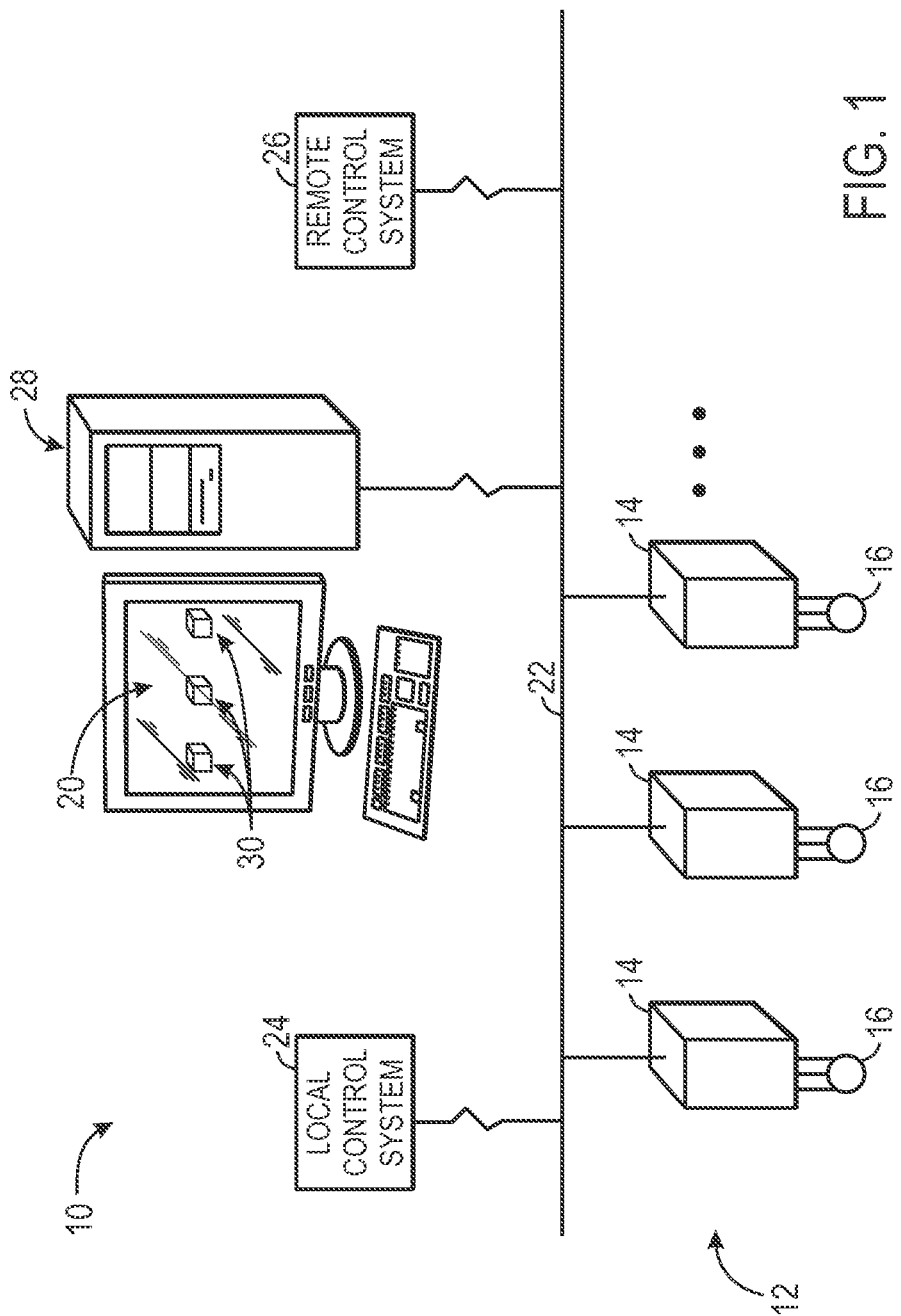
FIG. 1 is a schematic diagram of an industrial process that includes a plurality of automation devices in accordance with the present techniques.

Present embodiments are directed to facilitating user-interaction with automation devices on an automation control network, and particularly interaction with motor drives on an automation control network. Specifically, present embodiments facilitate configuration, communication, and interaction with automation system devices (e.g. motor drives) through implementation of intelligent, dynamic, device-configurable iconic representations of the system devices on a UI, wherein the devices themselves provide their corresponding iconic representations and associated functionality. Present embodiments also provide a simple and uncluttered interface to multiple automation devices. All necessary executable programs for the UI to facilitate configuring, maintaining, and troubleshooting the automation devices are acquired from the automation devices themselves. For example, executable applications, application tools, file associations, documentation (e.g., electrical drawings), parameters, and user manuals can be acquired and displayed based on provisions from each corresponding automation device (e.g., motor drive). Each automation device provides a single point interface for numerous external devices (e.g., workstations). For example, a plurality of different external devices may access a single automation device and receive the same icon configuration.

With respect to automation control, it is now recognized that it is desirable to implement, on a UI, a dynamic icon corresponding to a particular automation device such that the device itself defines and controls characteristics of the corresponding icon. In some embodiments, different types of representations may be dynamically controlled and provided by a particular automation device. Present embodiments are directed to configurable icons provided on a visualization (e.g., a graphical display view) of a UI for an automation control system, wherein each icon represents a physical device that is external to the UI. For example, in accordance with present embodiments, an icon for a motor drive (e.g., a PF7000 Medium Voltage Drive manufactured by ROCKWELL AUTOMATION) can be represented on a UI (e.g., a UI running on a version of WINDOWS operating system), wherein the icon characteristics (e.g., corresponding graphic and functional features) are completely controlled and defined by the motor drive. The motor drive communicates and controls the appearance of the icon and functional features of the icon via a network connection to the UI on which the icon is displayed. Indeed, the motor drive automatically configures the icon based on information within the motor drive.

By employing an aspect of a particular automation device to implement and provide characteristics for an icon representing that particular automation device on a UI, present embodiments are capable of providing icons that are dynamically discovered as opposed to being preconfigured. Indeed, the UI receives the icon from the corresponding automation device as opposed to generating the icon. Accordingly, icons for a single automation device can be consistently configured on every UI that interacts with the automation device. Further, present embodiments may enable essentially any computing device (e.g., laptop, notepad, or desktop computer) to communicatively interact with the device over a network via employment of a device-defined and functional icon for the automation device presented on a UI. Indeed, because present embodiments include instantiation on the corresponding workstation, a computing device without a hard drive may be utilized. Accordingly, present embodiments provide efficient configuration and also marginalize or eliminate issues related to firmware and software compatibility.

FIG. 1 is a schematic diagram of an automation system 10 for an industrial process 12 including a plurality of automation devices 14 (e.g., motor drives) that are networked together and employing features in accordance with present embodiments. The automation devices 14 illustrated in FIG. 1 are used to directly control or support machines 16 of the industrial process 12, as directed by a User Interface (UI) 20. The automation devices 14 are integrated together across a control network 22 and made accessible by the UI 20, which enables configuration and control of the automation devices 14 and related machines 16 by a user.

In one embodiment, the automation devices 14 include motor drives and the related machines 16 include motors. In other embodiments, the automation devices 14 may include one or more drives, motors, motor controllers, push buttons, signaling devices, relays, timers, sensors, switches, signal conditioning devices, circuit and load protection devices, energy monitoring devices, lighting and motion control devices, power supplies, input/output (I/O) interfaces for integrating the automation devices, programmable logic controllers (PLCs), operator interfaces, and so forth. Further, in other embodiments, the machines 16 may include different equipment specific to the industrial process. For example, if the industrial process 12 includes a conveyor system, the related machines 16 may include conveyor system equipment; if the industrial process 12 is an industrial air circulation process, the machines 16 may include industrial fan equipment; and so forth. In other words, the automation devices 14 may generally be used between different industrial processes, whereas the machines 16 used by the particular industrial process 12 are generally specific to the particular industrial process. In addition to the automation devices 14 illustrated in FIG. 1, which are used to directly control or support the machines 16 of the industrial process 12, the automation system 10 may also receive and/or transmit information to and from other local control system 24 and/or remote control systems 26.

The UI 20 may be used to monitor or control any number of automation devices 14 such that an operator may use the single UI 20 to monitor and control an entire process. In the illustrated embodiment, the UI 20 is a component (e.g., a software feature or application) of a workstation 28 and is capable of being configured to enable a user to interact with the network 22 and associated automation devices 14. In other embodiments, the UI 20 may include separate circuitry and processing features. Specifically, the UI 20 may provide a platform for interacting with the various automation devices 14 on the network 22 via icons 30 displayed in an interactive graphic or visualization of the UI 20. The icons 30 for each of the automation devices 14 serve as user-recognizable access points for features and data associated with each of the plurality of automation devices 14. Further, each of the illustrated icons 30 is provided and controlled by the corresponding automation device 14, as will be discussed in further detail below. It should be noted that, while FIG. 1 depicts the UI 20 as a feature of the workstation 28, in other embodiments, the UI 20 may be integral with one or more of the automation devices 14. Further, it should be noted that, while the illustrated embodiment includes icons 30 for automation devices 14 that are local to the network 22, in other embodiments, the UI 20 may present icons representative of automation devices 14 on the remote control system 26. Further, the remote control system 26 may be used to monitor and/or control the automation system 10 from a remote location.

As noted above, present embodiments include configurable and dynamic icons 30 presented on the UI 20 that are completely controlled and provided by the automation devices 14 associated with the icons 30. In contrast, in conventional applications, icons for certain automation devices may be created on a particular UI based on user inputs. Such icons are generally static, correspond to a single function, resident on a hard drive of the workstation, and require active installation. With regard to conventional applications, the user typically creates the icons on the particular UI. For example, a user is traditionally required to provide an Internet Protocol (IP) address and a file location on the automation device in order to create and configure an icon that is representative of any particular automation device. Further, in traditional automation applications, one icon per operation per automation device may be established, resulting in numerous icons per automation device that then require duplication on each terminal or workstation configured to access the automation device. Additionally, typical iconic representations are based on executable programs and documentation that are part of a UI, which employs a single version of a program to communicate to different automation devices.

It is now recognized that such traditional arrangements can create a number of inefficiencies and complications. For example, software on a conventional UI hosting the icon programs and documentation may not be compatible with an automation device with which the UI is in communication. Additionally, necessary software may not be readily available or the software may have to be purchased. Further, once the required software is obtained, a user may have to endure complicated or burdensome installation procedures. Also, when the UI is communicating with two or more similar automation devices simultaneously, each automation device may require a different version of software. Further, documentation and/or supporting files may be missing from the UI or may not correspond to the automation device with which communication is desired. Present embodiments address issues including dealing with compatibility of software with a particular automation device, acquisition of the required software, connection back to the automation device from which the software was acquired, and displaying only functions the UI can support. Indeed, in accordance with present embodiments, all objects may be acquired from the automation device 14 to which a shell program connects, and the related icon 30 represents.

Figure 2:
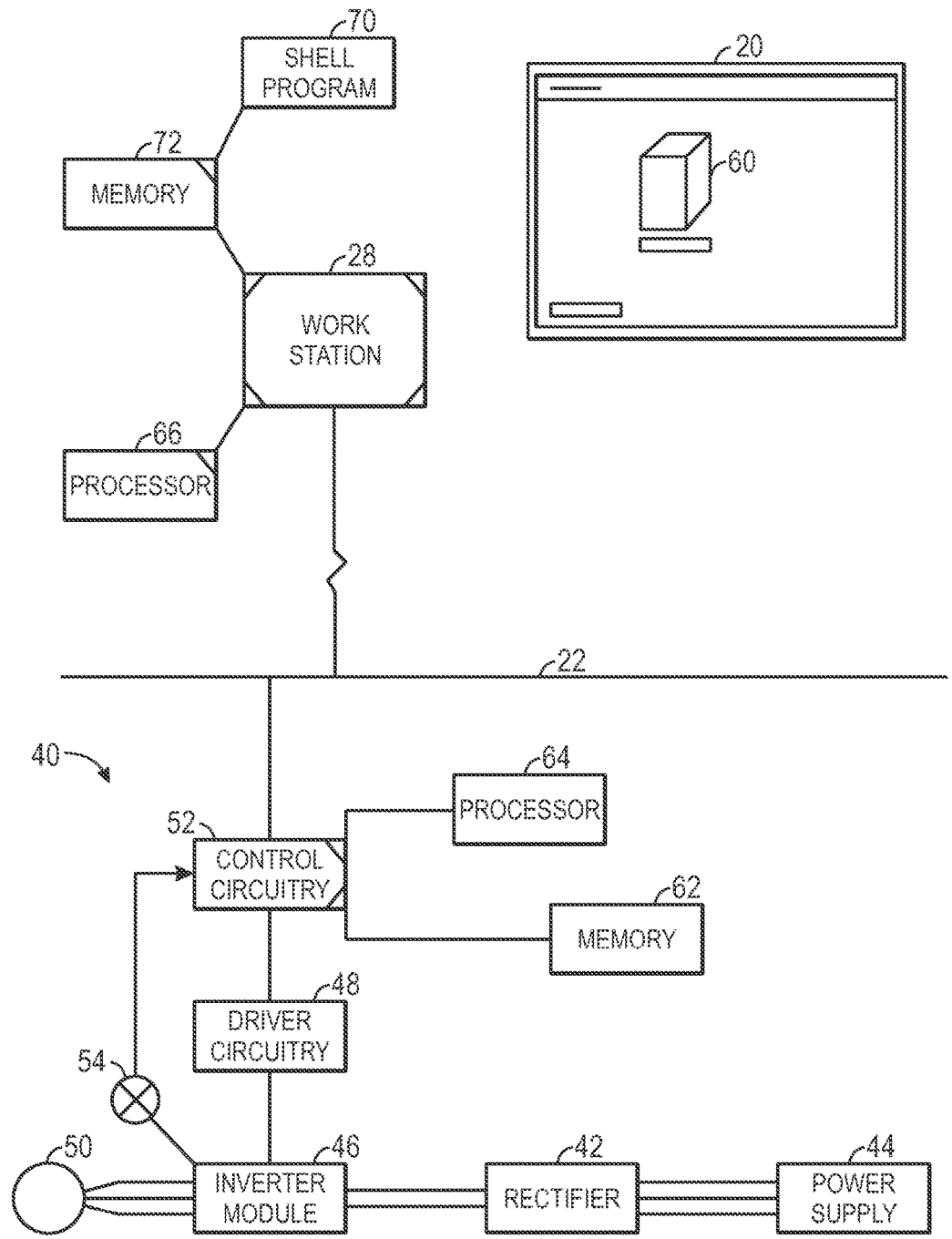
FIG. 2 is a schematic diagram of an industrial process including a workstation and a motor drive communicatively coupled via a network and including features in accordance with present techniques.

FIG. 2 provides a schematic representation of the terminal or workstation 28 communicatively coupled with a motor drive 40 via the control network 22, wherein the workstation 28 is presenting a visualization on the UI 20 in accordance with present embodiments. Indeed, the motor drive 40 is integrated with the network 22 and made accessible by the UI 20. Additionally, FIG. 2 provides details regarding the make-up of the motor drive 40. As generally illustrated in FIG. 2, the motor drive 40 includes a rectifier 42 that receives a constant frequency three-phase voltage waveform from a power supply 44. The rectifier 42 performs full wave rectification of the three-phase voltage waveform, outputting a direct current (DC) voltage to an inverter module 46. The inverter module 46 accepts the positive and negative lines of DC voltage from the rectifier 42 and outputs a discretized three-phase waveform at a desired frequency, independent of the frequency of the three-phase power supply 44. Driver circuitry 48 provides the inverter module 46 with appropriate signals, enabling the inverter module 46 to output the waveform. The resulting three-phase waveform may subsequently drive a load, such as a motor 50.

Control circuitry 52 may be coupled to the driver circuitry 48 and may be programmed to provide signals to the driver circuitry 48 for driving the motor 50. The control circuitry 52 may be programmed according to a specific drive configuration desired for a particular application. For example, the control circuitry 52 may be programmed to respond to external inputs, such as reference signals, alarms, command/status signals, etc. The external inputs may originate from one or more relays or other electronic devices. The programming of the control circuitry 52 may be accomplished through software configuration or firmware code that is loaded onto an internal memory 62 of the control circuitry 52. The firmware of the control circuitry 52 may be configured to respond to a defined set of configurable operating parameters. The settings of the various operating parameters determine the operating characteristics of the motor drive 40. For example, various operating parameters may determine the speed or torque of the motor 50 or may determine how the motor drive 40 responds to the various external inputs. As such, the operating parameters may be used to map I/O to control variables within the motor drive 40 or to configure network or other drive options into the drive control variables. These variables include things like: speed presets, feedback types and values, computational gains and variables, algorithm adjustments, status and feedback variables, and PLC-like control programming.

In some embodiments, the motor drive 40 may include one or more sensors 54 for detecting operating temperatures, voltages, currents, etc. With feedback data from sensors 54, control circuitry 52 may keep detailed track of the various conditions under which the inverter module 46 may be operating. The feedback data may be used to determine values for various feedback parameters, which may be displayed to the operator via the UI 20. Additionally, the feedback data generated over time by the sensors 54 may be stored on the internal memory 62 of the control circuitry 52, the workstation 28, or another memory.

The UI 20 enables the operator to control the motor drive 40 by allowing the operator to manipulate the set of operating parameters programmed into the firmware of the control circuitry 52. The UI 20 may also provide feedback to the operator, indicating motor drive conditions such as actual motor speed, frequency, power, alarm conditions, etc. Accordingly, the UI 20 may display the settings of some or all of the operating parameters of the motor drive 40. As will be discussed below, the UI 20 enables access to control of the motor drive 40 and access to data stored on the motor drive 40 via an icon 60 that represents the motor drive 40 on the UI 20. The appearance of this icon 60 and the functionality associated with the icon 60 are provided and determined by software or firmware located on the motor drive 50 itself.

Indeed, in accordance with present embodiment, an external physical automation device (the motor drive 40 in the illustrated embodiment of FIG. 2) provides and configures the functionality of a configurable icon for the external automation device. In other words, an icon for an automation device originates from and is configured by the automation device the icon represents. In the present disclosure, reference to an automation device being capable of defining or controlling characteristics of an icon may be read to include control of the visual appearance of the icon as well as other aspects, such as how to react to activation (e.g., selection or touch screen gestures). Indeed, a configurable icon may have a number of functions and attributes associated therewith in accordance with present embodiments. The configurable icon 60 may provide access to applications of the motor drive 40 such as data analyzers, wizards that guide users through features of the motor drive 40, report generation applications, and other applications provided by the motor drive 40. In one embodiment, a limited number of the functions of a configurable icon may be associated with the Operating System (OS) on which the UI operates, while a majority of the functionality of the configurable icon may be dictated by the associated automation device (e.g., the motor drive 40 of FIG. 2).

It should be noted that, as illustrated, the motor drive 40 also includes a memory 62, which is representative of a non-transitory, tangible, computer-readable medium, wherein the term non-transitory merely indicates that the medium is not a mere signal. In accordance with present embodiments, the memory 62 may include icon characteristics, supported operational features, programming, device applications, network applications, circuit diagrams, instructional literature, and so forth stored thereon and capable of implementation or being accessed by a processor 64 of the motor drive 40. However, in some embodiments the features on the memory 62 are capable of being accessed or implemented by a processor of a separate device, such as a processor 66 of the workstation 28. Indeed, in some embodiments, a particular automation device 14 may not include a processor. In some embodiments, the motor drive 40 includes numerous functional modules that cooperate to perform techniques in accordance with the present disclosure. Indeed, the motor drive 40 may include server circuitry that stores data related to intelligent icons. The server circuitry may communicatively couple with a drive processor circuit that in turn communicatively couples with an analog control board. Such features are generally represented by the illustrated memory 62 and processor 64.

As noted above, present embodiments are directed to device-configurable icons, such as the icons 30 or the icon 60, that represent physical devices (e.g., the motor drive 40) that are external to the UI 20 on which the icons 30, 60 are presented. In the illustrated embodiment, the motor drive 40 is specifically presenting the device-configured icon 60 in the visualization being presented by the UI 20, wherein the icon 60 is specifically representative of the motor drive 40. The various features (e.g., appearance and functional aspects) of the icon 60 may be generated by the features available on the memory 62. Indeed, as discussed below, operations of the icon 60 after it is selected are controlled by the motor drive 40.

In accordance with present embodiments, a shell program or software application may be utilized to automatically detect all automation devices 14 (e.g., motor drive 40) connected to the network 22. The shell program may be acquired from the automation devices 14 and instantiated on the workstation 28 via a file explorer or web application. The shell program is configured to look for automation devices 14 on the same subnet on which the workstation 28 resides by default or may be manually configured to look on user-defined subnets. When automation devices 14 are found, an icon is provided to the shell program for display along with a corresponding IP address and some identifying name of the automation device 14 (when available). If a particular automation device 14 is explicitly defined by an IP address that is found to be valid, it will always be displayed as an icon but may be indicated as inactive when it is inaccessible. For example, an automation device 14 that is in a download mode or has a version of software that cannot fully communicate with the shell program may be indicated by an icon with a yellow "X" through it or some other visual indication. Similarly, an automation device 14 that is sought after due to the configuration file but is not currently online may be indicated by an icon with a blue "X" through it or some other visual indication. In embodiments where the expected but unavailable automation devices are known to be of a particular type, an icon may be presented as representative of that general type when communication with the automation device is insufficient to actually provide the icon configuration. In other embodiments, a basic icon may be presented, such as a circle indicative of a sought after location.

In the illustrated embodiment, a shell program 70 is represented as being instantiated on a memory 72 (e.g., Random Access Memory) of the workstation 28 and activated using the processor 66 of the workstation 28. However, the shell program 70 may be stored at a different location. In one embodiment, the shell program 70 may reside on one or more of the automation devices 14. For example, the shell program 70 may be stored in the memory 62 of the motor drive 40. Further, the shell program 70 may not initially be instantiated on the workstation 28. Indeed, the workstation 28 may acquire the shell program 70 from one or more of the various automation devices 14. This enables a computer to function as a terminal capable of accessing and controlling certain automation devices 14 on the network 22 without requiring user-initiated, unique software updates or pre-configuration. Rather, upon entering, into a computer, an IP address for a capable automation device 14 that is storing the shell program 70, the shell program 70 may be instantiated on the computer and activated. While present embodiments may include transfer of the shell program 70 to a hard drive of the workstation 28, a workstation 28 without a hard drive can implement the shell program 70 by temporarily storing the shell program 70 on a Random Access Memory (RAM) and instantiating the shell program 70 from there. In both cases, the shell program 70 is instantiated from its storage location. Once instantiated, the shell program 70 may broadcast a message to all devices on the network 22 and await a response. The capable automation devices 14 may then provide the device-configured icons 30 for display on the UI 20 of the computer, which has now been established as the terminal or workstation 28.

Figure 3:
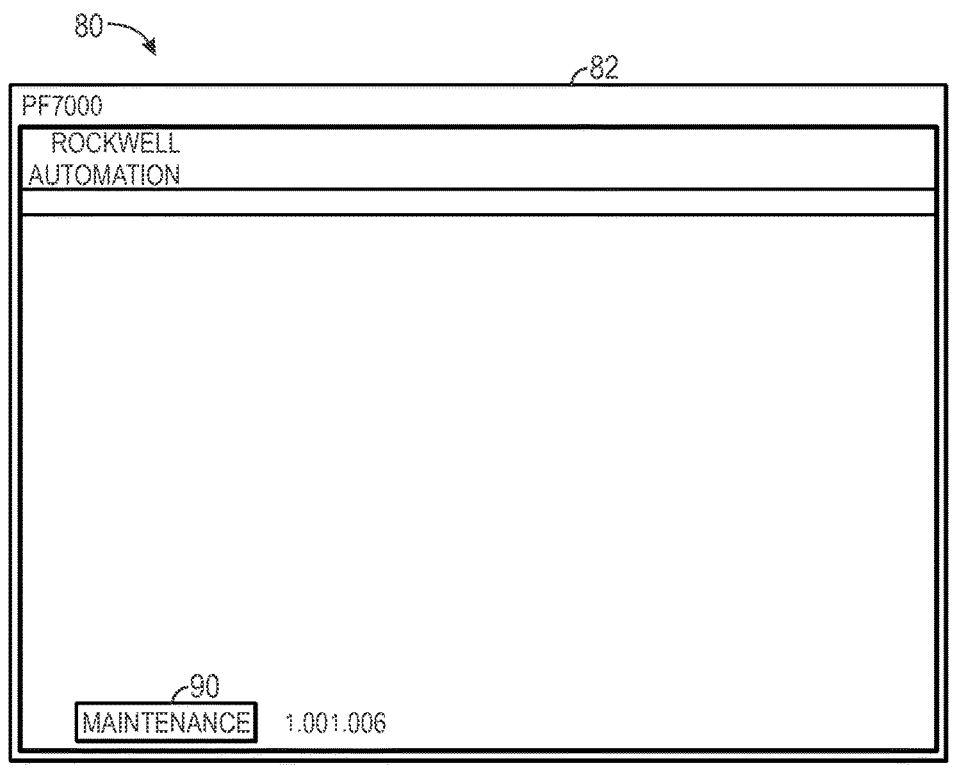
FIG. 3 is an empty shell generated by a shell program on a user interface in accordance with present techniques.
Figure 4:
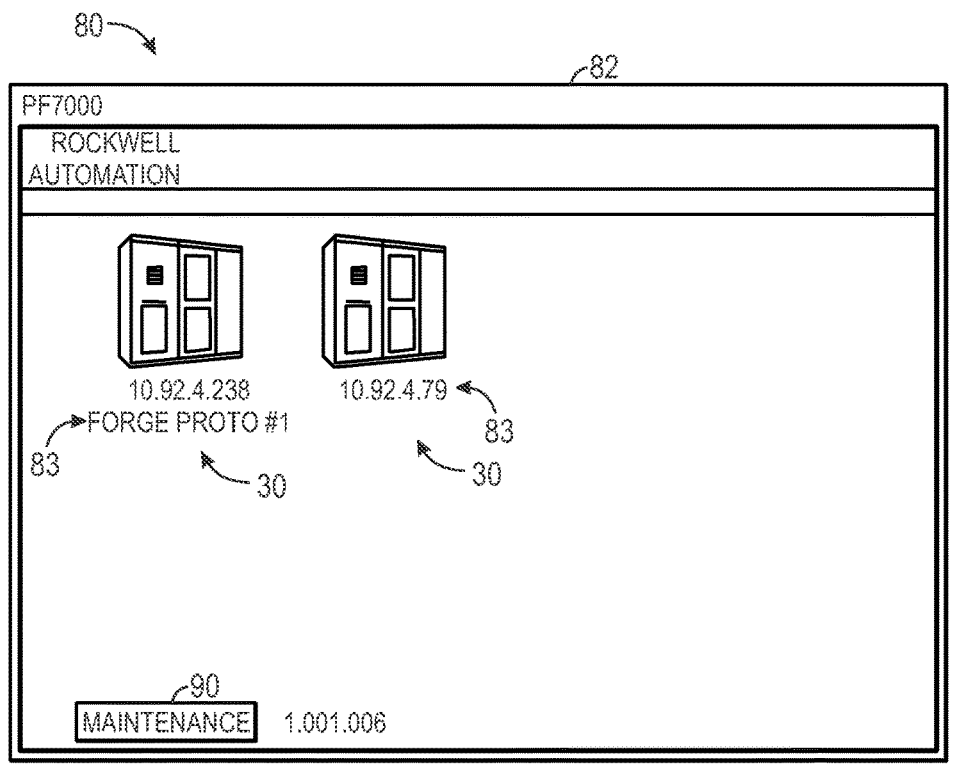
FIG. 4 is a populated shell including intelligent device-configurable icons provided by an automation device in accordance with present techniques.

In operation, the shell program 70 is executed on the workstation 28. As noted above, the shell program 70 can be acquired from one of the automation devices 14 that the shell program 70 communicates with and supports. However, in one embodiment, the shell program 70 can reside on the workstation 28 (e.g., a personal computer). When initially instantiated, the visualization or "shell" 80 provided by the UI 20 appears empty, as illustrated in FIG. 3, wherein only framework 82 of the shell 80 is visible. However, based on the broadcast and response operation discussed above, applicable automation devices 14 on the network 22 will be automatically detected, and the capable automation devices 14 will provide the icons 30 within the shell 80, as depicted in FIG. 4. The display of names 83 associated with the automation devices 14 and their corresponding icons 30 may depend on the manner in which the automation devices 14 were detected by the shell program 70. For an automation device 14 that is active and fully capable of communication, the name 83 may be extracted from the automation device 14 itself. If the automation device 14 is detected automatically but lacks full communication capabilities (e.g., during program mode), no name may be displayed. For an automation device 14 that is not communicating and was listed in a configuration file, a default name provided by the configuration file may be displayed. It should be noted that the shell 80 can display the icons 30 for multiple automation devices 14 (as driven by the automation devices 14 themselves), wherein each icon 30 has its own unique configuration.

Figure 5:
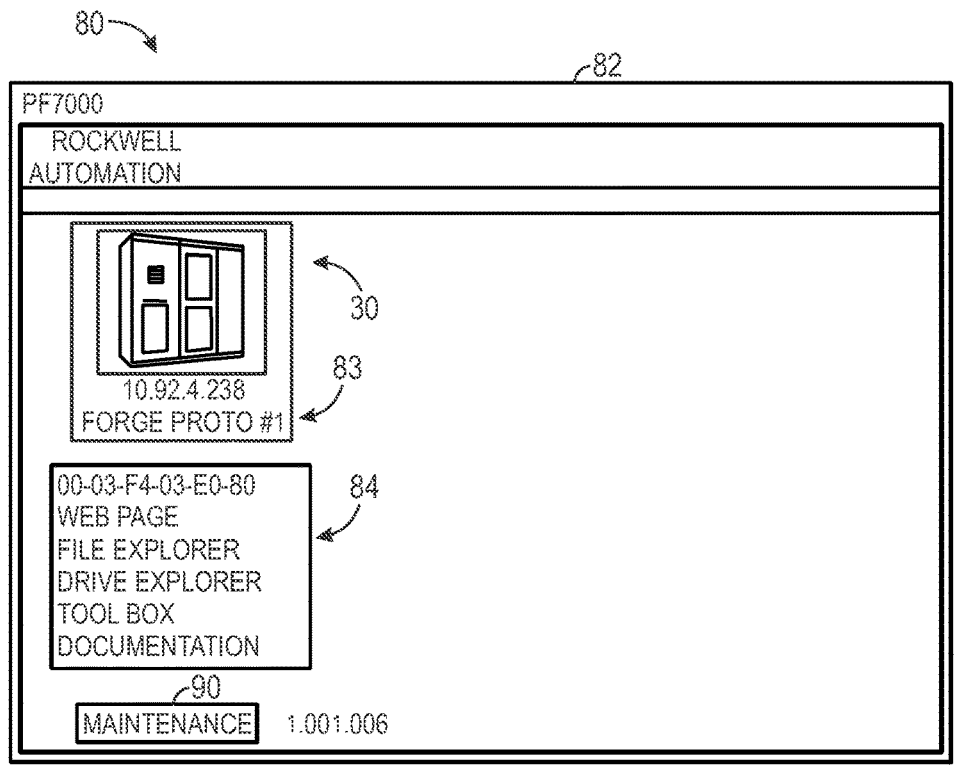
FIG. 5 is a populate shell wherein an included icon is displaying an icon menu including a list of functions provided by an automation device in accordance with present techniques.

Once displayed, the icons 30 are capable of being selected or clicked by a user via manipulation of a cursor or pointer of the UI 20. When one of the icons 30 is clicked (selected), a menu 84 is presented, as depicted in FIG. 5. In some embodiments, certain features (e.g., menu items) may be depicted and selectable within the icon 30. The contents of the menu 84 and the manner in which the menu 84 behaves are determined by the corresponding automation device 14 (i.e., the device 14 that is represented by the selected icon 30). Some aspects of the menu 84 may be determined by the type of OS on which the shell program 70 is running In accordance with present embodiments, the shell program 70 may be configured to run on a WINDOWS OS (e.g., WINDOWS XP, VISTA, WINDOWS 7, or WINDOWS CE). However, in some embodiments, functionality of the menu 84 may vary with the OS being used. For example, the shell program 70 may be configured to only display aspects that are appropriate for the OS being employed.

Figure 6:
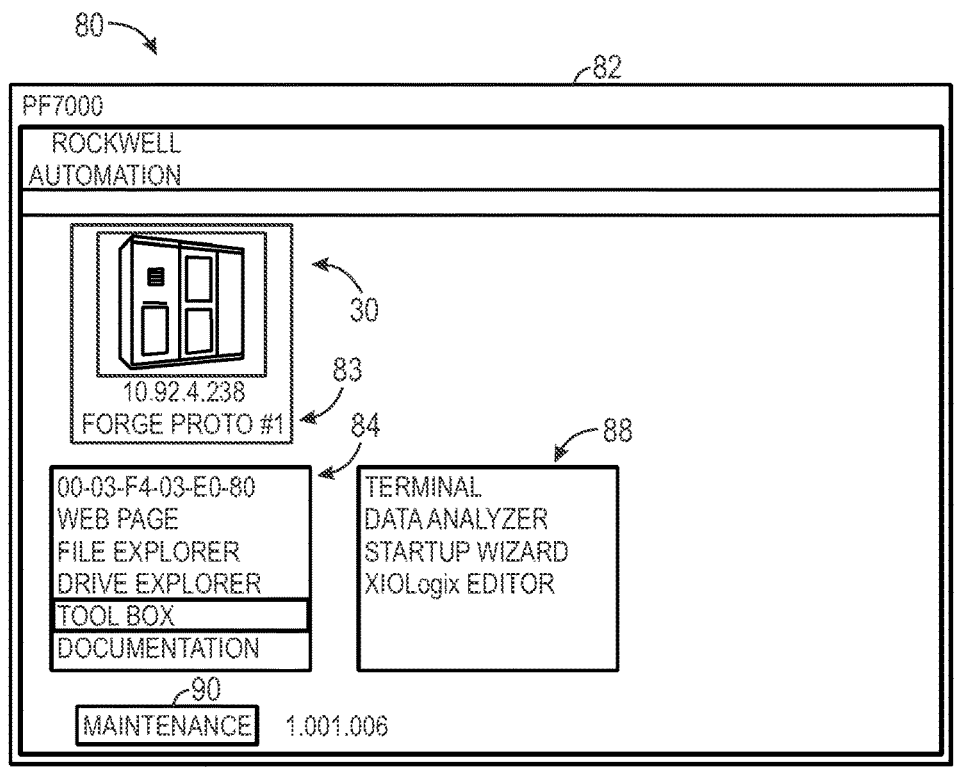
FIG. 6 is the populated shell of FIG. 5, wherein a sub menu of the icon is being displayed with a list of functions provided by the automation device in accordance with present techniques.

As indicated above, the menu 84 is activated upon selection of the corresponding icon 30 by a user. Upon selection of the icon 30, the device 14 controlling the selected icon 30 provides the menu 84 and the functionality of the menu 84. The functionality provided by the menu 84 may include various different operations or application tools. A first function may include opening a sub menu 88, as illustrated in FIG. 6. The sub menu 88 may contain any of the functionality of the main menu 84. In some embodiments, the menu 84 includes items common to all similar automation devices 14 (e.g., motor drives) while the sub menu 88 includes items unique to the accessed automation device 14. A second function may include acquiring and launching an executable program from the automation device 14 that is represented by the selected icon 30. An executable program launched in this fashion may establish a communication channel back to the automation device 14, if appropriate. A third function may include displaying a web page from the automation device 14 represented by the selected icon 30. A fourth function may include launching a file browser or explorer, which will provide access to a file structure associated with the automation device 14 represented by the selected icon 30. A fifth function may include acquiring files (e.g., system documentation) from the automation device 14 represented by the selected icon 30, and using an association to launch a reader program resident on the workstation 28 that enables viewing of the acquired files. A sixth function may include opening specific dialogues within the shell 80 in order to provide a maintenance-type of functionality between the shell program 70 and the automation device 14 corresponding to the selected icon 30.

Selection of a menu item (e.g., via placing a cursor or pointer over the menu item and clicking a mouse button) for a particular device 14 may initiate performance of a selected function via several different pathways. In one instance, a menu function may be performed via a temporary file download from the device 14. In other situations, performance may include file association to an application, execution of an application, or passing an IP address for the particular device 14 to an executed application. In accordance with present embodiments, multiple automation devices 14 may be worked upon with their own unique applications. That is, each automation device 14 may have its own version of an application tool open at the same time as similar application tools for other automation devices 14. It should also be noted that present embodiments enable defining or changing an IP address of a particular automation device 14 based on the unique Media Access Control Identification (MAC ID) of the automation device 14.

As noted above, the shell 80 is initially empty. Indeed, the shell program 70 does not initially know which devices will function with the shell program 70. Accordingly, the shell program 70 initiates or performs a discovery process to establish which automation devices 14 will be represented as the icons 30 and/or accessible via the shell 80. This is briefly discussed above with respect to broadcasting a message to devices 14 on the network 22. More specifically, in one embodiment, the discovery process includes sending out a User Datagram Protocol (UDP) broadcast to all devices 14 on the network 22 using a specific port. A participating automation device 14 that recognizes a signature of this broadcast will respond with its own signature. This signature for the responding automation device 14 indicates to the shell program 70 that a participating automation device 14 has been discovered. In some embodiments, the shell program 70 may be limited as to the number of discovered automation devices 14 that can be presented within the shell 80. For example, in one embodiment, the shell 80 can contain a maximum of eight icons 30. However, in other embodiments any number of discovered automation devices 14 may be presented. Indeed, in one embodiment, the shell 80 may include a scrollable window and access to adjustable memory availability to provide for the discovery of an indefinite number of automation devices 14.

Figure 7:
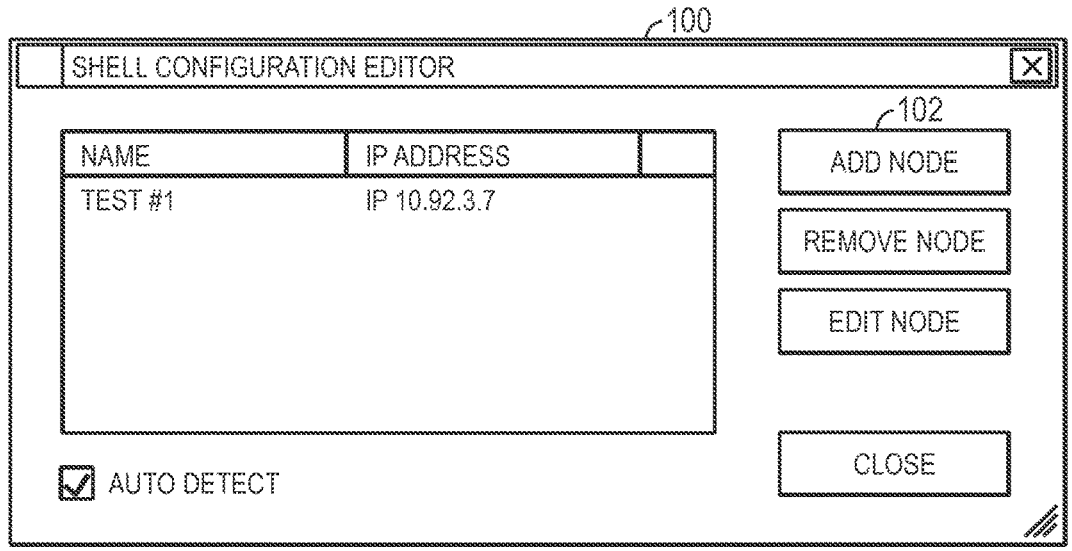
FIG. 7 is a shell configuration editor provided in accordance with present techniques.
Figure 8:
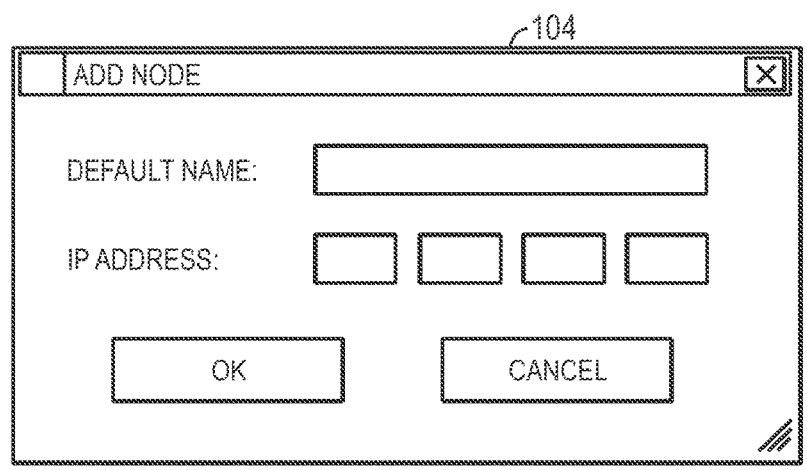
FIG. 8 is an add node window generated in response to activation of a feature of the shell configuration editor in accordance with present techniques.

In some embodiments, automation devices 14 that are resident on remote networks are not discoverable by the shell program 70. Indeed, in some embodiments, the shell program 70 is limited to discovery of automation devices 14 on the local network 22. However, the shell program 70 may still be capable of cooperating with automation devices 14 on a remote network. Indeed, the shell program 70 may include a provision for defining a specific IP address that should be included in the discovery process. For example, a maintenance button 90 of the shell program 70 may be selected to summon a configuration editor 100, as illustrated in FIG. 7. Further, an add node button 102 may be selected to summon an add node window 104, as illustrated in FIG. 8, and the IP address may be entered. Thus, the IP address for an automation device 14 on a remote network may be requested to provide its capability to the shell program. Providing an explicit IP address in this manner may also be used to ensure that an icon 30 is displayed for a particular automation device 14 regardless of whether the particular automation device 14 is currently online. Once a new automation device 14 is added, the maintenance button 90 may be employed to refresh the shell 80. Indeed, the maintenance button 90 may be employed at any time to refresh the display of participating devices 14.

When an automation device 14 is discovered by the shell program 70 in accordance with present embodiments, the automation device 14 provides certain information and features to the shell program 70. In one embodiment, a file may be acquired by the shell program 70 from the discovered automation device 14 in order to define the characteristics and operation of the associated icon 30. This acquired file may be an XML file that provides configuration data unique to each discovered automation device 14. The icon 30 may be generated based on this configuration data of the XML file.

The IP address of the discovered automation device 14 is passed into an executable program upon launch, which enables the executable file to connect back with the device 14 represented by the icon 30. In this manner, similar executable programs from different automation devices 14 will operate with only the automation device 14 from which the executable programs were respectively acquired. This ensures that compatibility of the executable program with the automation device 14 from which it was acquired is maintained. Similar executable programs of different versions may operate together, interfacing with the automation device 14 from which they came and are compatible. Acquisition of objects from the automation device 14 may be handled via HTTP requests to the automation device 14. Objects that are acquired may be stored in a temporary directory of the workstation 28 and executed or viewed local to the UI 20.

The shell program 70 and the associated discovery process enable operational access to automation devices 14 on the network 22 without requiring entry of an IP address for each device. Indeed, a user never has to enter an IP address into any executable programs launched by the shell program 70. Further, because certain automation devices 14 in accordance with present embodiment provide an XML configuration file for use by the UI 20, such automation devices 14 can uniquely define the operation and content of the icon 30 that represents the corresponding automation device 14 within the shell 80. Also, because each automation device 14 may contain a unique set of features (e.g., software tools and documentation) that provide the characteristics of corresponding icon 30, these features can be consistently compatible with the automation device 14 itself. Further, the automation device 14 can consistently provide a single access point for a number of external devices (e.g., workstations) that receive the icon 30 from the automation device 14. Thus, present embodiments employ the shell program 70 to acquire all necessary tools and documentation for providing a functional icon 30 from the automation devices 14 themselves and eliminate issues related to compatibility and availability of features (e.g., software or firmware).

Figure 9:
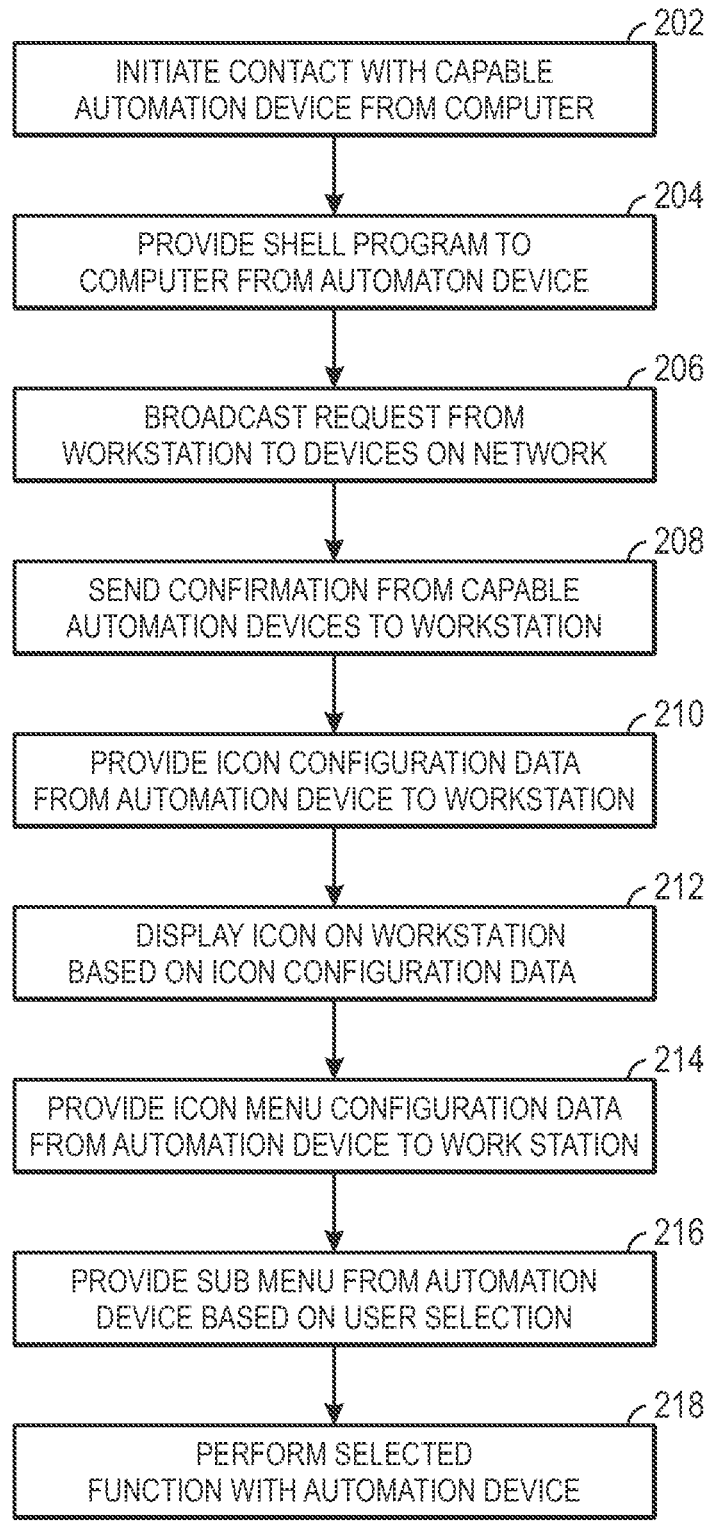
FIG. 9 is a block diagram of a method in accordance with present techniques.

FIG. 9 is a block diagram of a method in accordance with present techniques. Portions of the method may be performed based on computer-readable instructions stored on a memory. The method begins with a computer initiating contact with an automation device over an automation control network in accordance with present embodiments (block 202). This may include using the computer to access an IP address for the automation device based on a user entry. The automation device responds to the computer by providing a copy of a shell program that is subsequently installed on the computer (block 204). The shell program will enable the computer to function as a workstation for the automation device and related automation devices.

Based on instantiation of the shell program, the workstation sends a broadcast to all devices on the network requesting a response from capable automation devices (block 206). Thus, an automation device can detect the shell program by receiving the broadcast. In response, automation devices that receive the broadcast and that are capable of understanding the broadcast respond with a confirmation (e.g., a signature) (block 208). Further, the automation devices provide icon configuration data that controls an icon for display on a user interface of the workstation (block 210). It should be noted that reference to a workstation may include both a computer and user interface.

The workstation displays the icon, which is essentially completely configured by the automation device that the icon represents (block 212). These operations may be performed in response to ionic representation instructions of a computer program. When the icon is selected (e.g., a user selects the icon with a cursor or pointer), the automation device provides an icon menu that is displayed within or proximate to the icon. Such operations may be performed in response to menu instructions of a computer program. For example, the menu may extend from the icon (e.g., from below the icon). Specifically, the automation device provides a list of functions or functional features of the automation device that are displayed in an icon menu and capable of selection (block 214). If certain functions are selected from the menu, the automation device may provide a sub menu that extends from the icon menu (block 216). Further, when a particular one of the functions is selected, the automation device performs the selected function (218). For example, the automation device may perform a device-specific function. Specifically, for example, wherein the automation device is a motor drive, the motor drive may provide and launch an application on the UI that enables the drive to be controlled from the UI.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A motor drive system, comprising:
power circuitry comprising a power inverter configured to provide three-phase electrical power to drive an electric motor;
motor drive control circuitry configured to provide control signals for controlling operation of the power circuitry;
memory circuitry storing parameter data utilized by the control circuitry, in operation, for controlling the power circuitry and thereby the electric motor; and
a user interface stored in the memory circuitry and comprising an executable program that, in operation, is served to a remote system in communication with the motor drive system via a network, wherein the remote system requires the executable program to interact with the motor drive system and wherein the executable program, when instantiated by the remote system, allows access to the parameter data.

2. The system of claim 1, wherein the motor drive system comprises code allowing discovery of the motor drive system by the remote system.

3. The system of claim 2, wherein the motor drive system is represented as a configurable icon when discovered by the remote system.

4. The system of claim 1, wherein the executable program is represented as a configurable icon that, when selected by a user of the remote system, instantiates the executable program.

5. The system of claim 1, wherein the executable program, when executed by the remote system, permits access, from the motor drive system, of operational features of the motor drive system.

6. The system of claim 1, wherein the executable program, when executed by the remote system, permits access, from the motor drive system, to device applications stored on the motor drive system.

7. The system of claim 1, wherein the executable program, when executed by the remote system, permits access, from the motor drive system, to network applications stored on the motor drive system.

8. The system of claim 1, wherein the executable program, when executed by the remote system, permits access, from the motor drive system, to a circuit diagram stored on the motor drive system.

9. The system of claim 1, wherein the executable program, when executed by the remote system, permits access, from the motor drive system, to instructional literature stored on the motor drive system.

10. The system of claim 1, wherein the executable program, when executed by the remote system, permits access to other motor drive systems not otherwise discoverable by the remote system.

11. A motor drive system, comprising:
power circuitry comprising a power inverter configured to provide three-phase electrical power to drive an electric motor;
motor drive control circuitry configured to provide control signals for controlling operation of the power circuitry;
memory circuitry storing parameter data utilized by the control circuitry, in operation, for controlling the power circuitry and thereby the electric motor; and
a server stored in the memory circuitry and comprising a visualization that provides a configurable icon representative of the motor drive system and that, when presented by the server to a remote system in communication with the motor drive system via a network, and when selected by a user via the remote system, causes transfer and execution of an executable program stored on the motor drive system to interact with the motor drive system and to access to the parameter data.

12. The system of claim 11, wherein the motor drive system comprises code allowing discovery of the motor drive system by the remote system.

13. The system of claim 12, wherein the configurable icon and executable program transfer the code to the remote system to permit the motor drive system to be discovered by the remote system.

14. The system of claim 11, wherein the executable program, when executed by the remote system, permits access, from the motor drive system, to operational features of the motor drive system.

15. The system of claim 11, wherein the executable program, when executed by the remote system, permits access, from the motor drive system, to device applications stored on the motor drive system.

16. The system of claim 11, wherein the executable program, when executed by the remote system, permits access, from the motor drive system, to network applications stored on the motor drive system.

17. The system of claim 11, wherein the executable program, when executed by the remote system, permits access, from the motor drive system, to a circuit diagram stored on the motor drive system.

18. The system of claim 1, wherein the executable program, when executed by the remote system, permits access, from the motor drive system, to instructional literature stored on the motor drive system.

19. A motor drive system, comprising:
power circuitry comprising a power inverter configured to provide three-phase electrical power to drive an electric motor;
motor drive control circuitry configured to provide control signals for controlling operation of the power circuitry;
memory circuitry storing parameter data utilized by the control circuitry, in operation, for controlling the power circuitry and thereby the electric motor; and
a server stored in the memory circuitry and comprising a visualization that provides visual representations of executable programs stored in the memory circuitry and that, when presented by the server to a remote system in communication with the motor drive system via a network, and when selected by a user via the remote system, cause transfer and execution of the executable programs to interact with the motor drive system and to access to the parameter data.

20. The system of claim 19, wherein at least one of the visual representations comprises an icon representative of the motor drive system.

21. The system of claim 19, wherein at least one of the visual representations allows execution of a discovery program by which the remote system may access the motor drive system and other motor drive systems not otherwise accessible by the remote system.

22. The system of claim 19, wherein the executable program, when executed by the remote system, permits access, from the motor drive system, to device applications stored on the motor drive system.

23. The system of claim 19, wherein the executable program, when executed by the remote system, permits access, from the motor drive system, to a circuit diagram stored on the motor drive system.

24. The system of claim 19, wherein the executable program, when executed by the remote system, permits access, from the motor drive system, to instructional literature stored on the motor drive system.

25. The system of claim 19, wherein the executable program, when executed by the remote system, initiates a broadcast and response process for discovering automation devices via the network.

* * * * *